Figure 7:
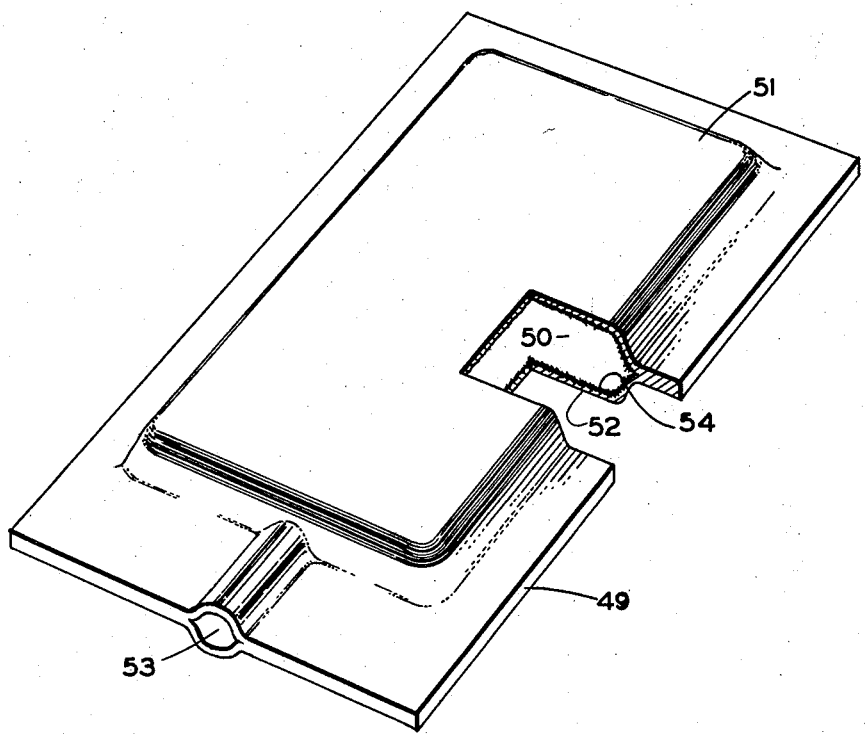

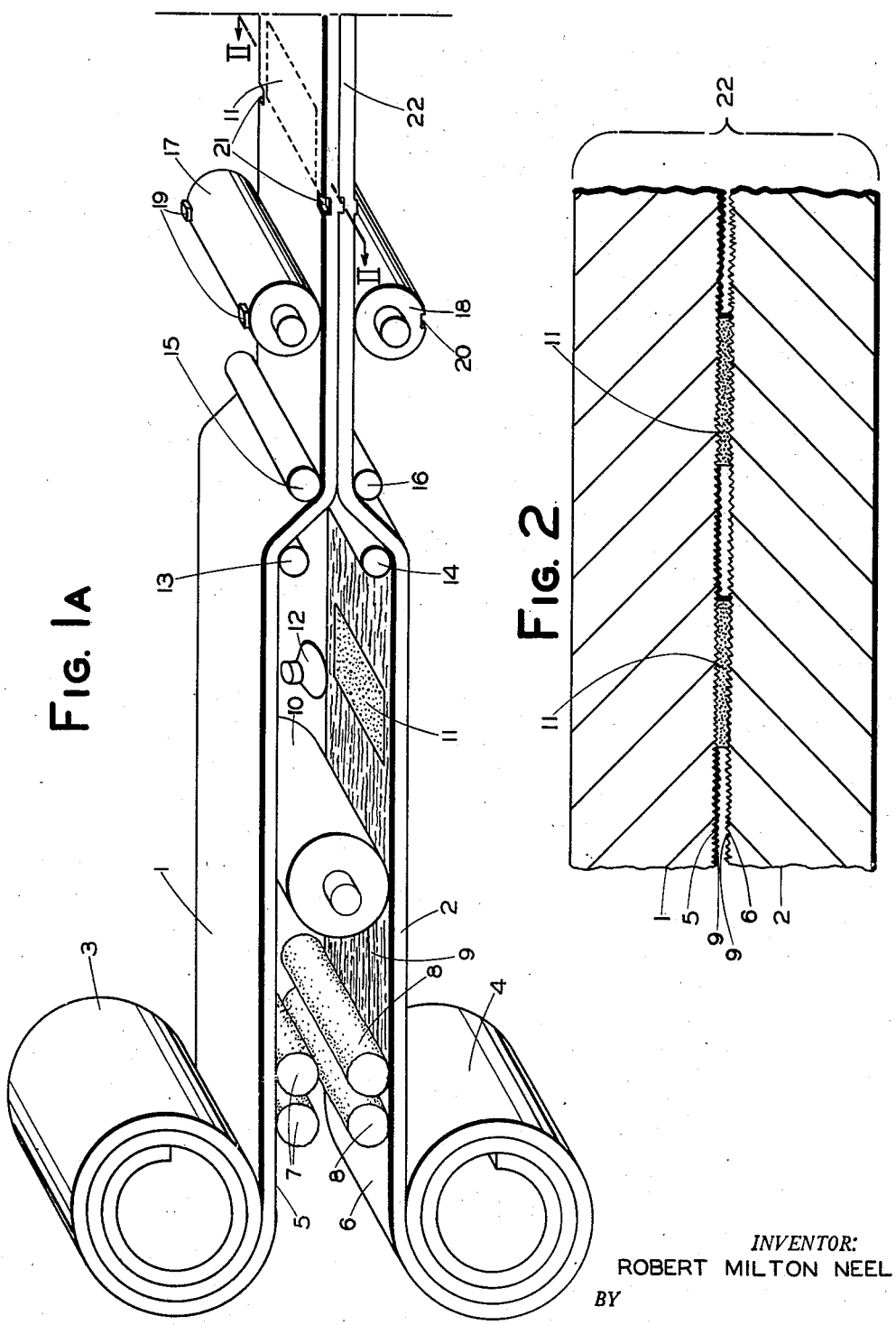

Sept. 29, 1959 R. M. NEEL 2,906,006
METHOD OF MAKING A SHEET METAL ARTICLE
Filed April 13, 1954 4 Sheets-Sheet 2
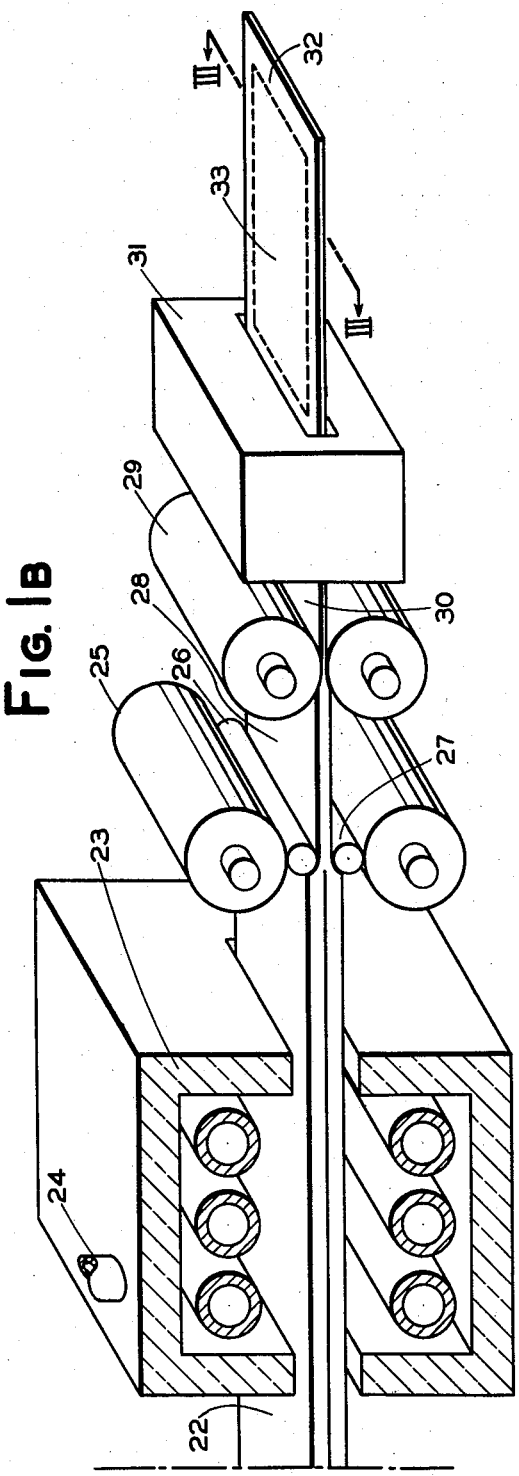
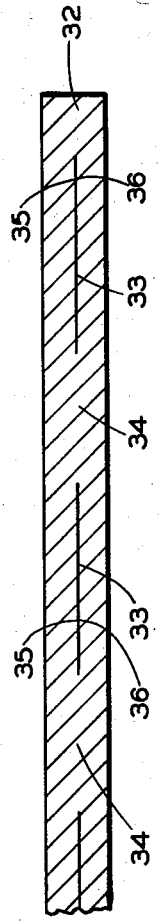
INVENTOR:
ROBERT MILTON NEEL
BY
John D. Williams
ATTORNEY Sept. 29, 1959          R. M. NEEL          2,906,006
METHOD OF MAKING A SHEET METAL ARTICLE
Filed April 13, 1954          4 Sheets-Sheet 3
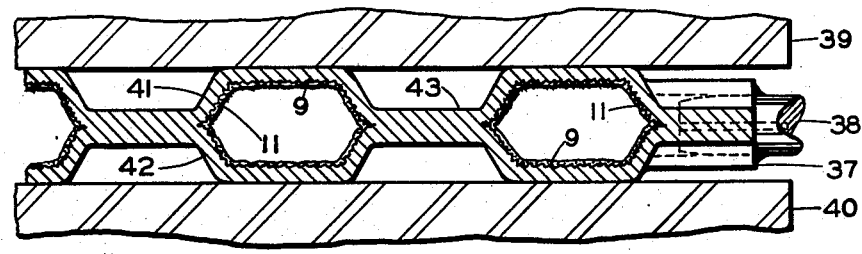
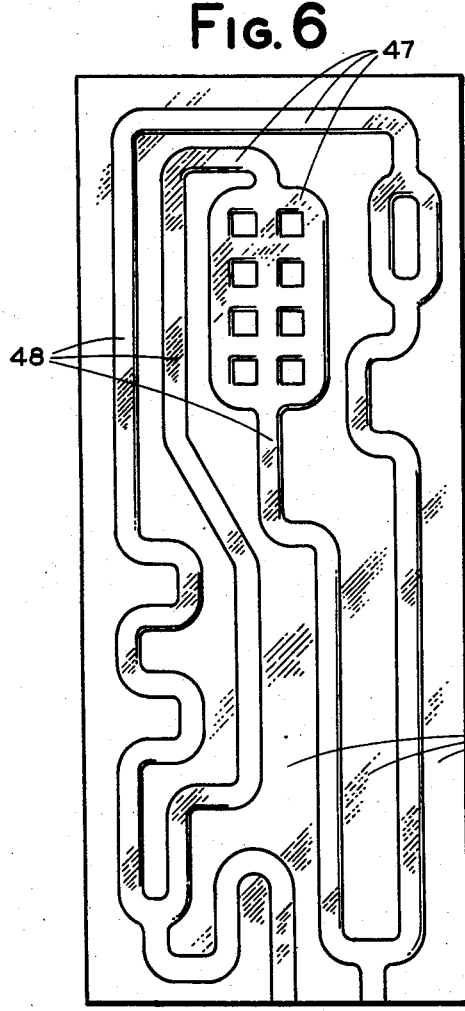
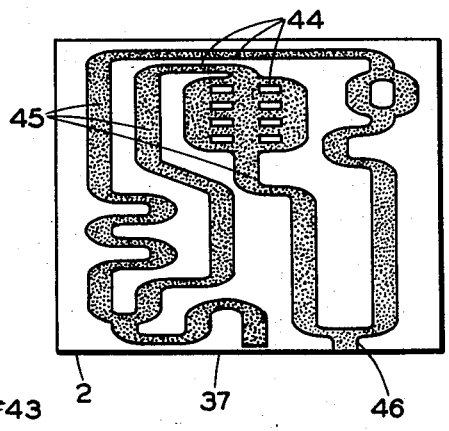
INVENTOR:
ROBERT MILTON NEEL
BY
*John T. Wilkins*
ATTORNEY Sept. 29, 1959 R. M. NEEL 2,906,006
METHOD OF MAKING A SHEET METAL ARTICLE
Filed April 13, 1954 4 Sheets-Sheet 4

INVENTOR:
ROBERT MILTON NEEL
BY
John D. Wilkins
ATTORNEY

United States Patent Office 2,906,006
Patented Sept. 29, 1959

2,906,006

METHOD OF MAKING A SHEET METAL ARTICLE

Robert Milton Neel, New Douglas, Ill., assignor to Olin Mathieson Chemical Corporation, a corporation of Virginia Application April 13, 1954, Serial No. 422,752

5 Claims. (Cl. 29—157.3)

This invention relates to a method of fabrication of a sheet metal structure and in particular to the fabrication of a novel light sheet metal structure or strip adapted for the fabrication of hollow metal articles, and to the resulting product.

In making various hollow articles, it is desirable and customary to employ relatively thin gage sheet metal. For many uses of such articles, and especially as heat exchangers, refrigerator evaporators and aircraft radiators, it would be highly desirable that they be constructed of light metal such as aluminum and the like.

In the fabrication of hollow sheet metal articles of all sorts according to a heretofore usual method it has been necessary to first emboss each of a pair of such sheets with groove and channels to provide the complimentary halves of the article or to at least emboss one of a pair of the component sheets to provide the interconnected passageways and conduits needed between the sheets. As an additional step of such method there is required a joining operation whereby the two component sheets are caused to adhere. For this step a soldering or brazing operation is employed or sometimes an electric welding operation along areas between the embossed channel.

It has long been recognized that this process of construction which requires the use of forming dies and presses often of great complexity and costs together with welding or brazing apparatus including fixtures and furnaces or welding materials leaves much to be desired in the way of economy and has various other disadvantages. One is that the subsequent jointing operation required involves heating which impairs any temper and improved strength which may have been imparted by working of the sheets. At best die working and heating in soldering or welding introduces a hazard or an uncertain variability to the strength of the article manufactured. Furthermore, in soldering and brazing operation there is the need for the extra step of introducing fluxes to assist in making more certain the formation of an acceptable joint which at best is of such low strength or poor ductility as to constitute the weakest part of the resultant structure. Often the introduction of the brazing material, which may be in the form of an insert sheet or a paste, and its proper positioning is a difficult problem. In spite of precautions the brazed joint is not always mechanically perfect and may break on application of stress. The appearance of brazed or soldered joint is frequently unsightly.

Where electric welding is employed proper control of the apparatus is not easy to maintain over long periods and poor joints are produced all too frequently. The spot welding and arc welding techniques are not adapted for sealing of sheets between the passageways particularly where the passages are laid out in long runs following not only straight but also serpentine or other intricate and tortuous paths. With such welded structures voids are often present between the sheets at points other than the passageways and give rise to poor strength and even leaks obviously intolerable in the case of heat exchangers. Further the coarse grained cast structure of electric welds tends to weaken the fabricated structure at these points and especially where the welds are numerous and closely spaced the surfaces of the sheet are marred badly and tend to adhere to the electrodes and require frequent dressing of the electrodes.

A method of making hollow articles, which would obviate some of the disadvantages set forth in the foregoing, briefly consists in superpositioning two sheets of metal, sealing the edges of the sheets by welding, joining the juxtaposed or inner faces of the sheets at a few widely spaced intervals by spot-welding and then introducing fluid pressure into the composite envelope through a hole in one of the sheets to expand and separate the sheets between the spot-welds. While this method avoids the metal drawing operation and also the heating operation which accompanies soldering or brazing, it suffers from the disadvantages pointed out with respect to electric welding, particularly when it is attempted to construct articles of a metal such as aluminum. Likewise this method is not economically adaptable to modification so as to produce articles having passageways of some complexity which may constitute only a minor portion of the sheet area as is frequently the case. In any event the inflation pressure is seriously limited and subsequent pressures encountered in ultimate use of the devices are likewise limited as the solder or brazed joint or the electric weld proves defective or low in strength. For the above-mentioned reasons this method has not been too successful.

Although easier and more reliable fabrication of hollow sheet ware of the plate type from aluminum has been a long standing desideratum in the art, its realization has never materialized because as compared to other common metals aluminum is difficult to join. The problems involved in soldering, brazing or electric welding of aluminum have been discouraging and have retarded the more extensive use and development of light metal hollow articles of the plate type, i.e. the type wherein passageways are formed between two adhered sheets of metal.

Therefore one object of this invention is to provide a novel sheet metal structure and a process for making the same free from the aforementioned shortcomings of the prior art. Another object is the provision of a method of making a sheet metal article adaptable to fabricating of hollow articles by inflation rather than by embossing and which may have any pattern of passageways without limitation as to complexity. Another object is to provide a sheet metal article which will permit the fabricator of the ultimate product to eliminate costly joining operations. Another object is to make plate type hollow aluminum ware simply and inexpensively and which is of improved appearance and strength. Another object is to provide an economical method of manufacturing hollow articles directly from light metal in strip or sheet form. Another object is to provide aluminum strip metal stock especially adapted for the economical fabrication of heat exchangers of improved appearance, strength and free from leaks. A still further object is to provide a novel aluminum heat exchanger structure of high thermal efficiency. Yet another object is the provision of a hollow sheet metal structure characterized by lightness without sacrifice of strength. Still other objects and advantages will become evident from the following more detailed description of the invention and of a preferred embodiment thereof when taken together with the accompanying drawing in which:

Figure 1A is a semi-diagrammatic perspective view of the first portion of metal strip treating apparatus and metal undergoing treatment in accordance with a preferred embodiment of this invention. Figure 1B is a semi-diagrammatic perspective view of the portion of metal treating apparatus and metal undergoing treatment which follows and is a continuation of the portion illustrated in Figure 1A. Figure 2 is an enlarged cross sectional view taken on line II—II of Figure 1A showing only one portion of the assembly of component strips including a section through one part of the applied separation material. Figure 3 is a cross sectional view taken on line III—III of Figure 1B of the partially laminated stock produced. Figure 4 is a cross sectional view showing the details of a portion of a hollow metal article made in accordance with this invention. Figure 5 is a plan view of a typical foreshortened pattern of separation material as applied to a component strip. Figure 6 is a plan view of a finished hollow article formed with the pattern of Figure 5 in accordance with this invention. Figure 7 is a perspective view of still another typical article formed in accordance with this invention and having a portion cut away, the better to illustrate the structure.

In accordance with this invention there is provided a partially laminated, i.e. internally parted, otherwise unitary or single body of wrought aluminum sheet metal, the parted section of which is disposed between the exterior substantially flat surfaces in the predetermined configuration of an embryonic recess or hollow capable of being brought into being by fluid pressure expansion. Likewise, in accordance with this invention such wrought aluminous sheet metal structure is formed by a sequence of special process steps whereby a plurality of component metal sheets are so united as to have lost their identity as separate components while embracing within the resultant unitary body of metal strip at least one stratum wherein the body is parted interfacially with substantially no separation thereby providing a strip having not only all the handling advantages of a conventional strip of metal but also the many other advantages pointed out and otherwise hereby made apparent. The special process of this invention includes preliminary treatment of the to-be-juxtaposed surfaces of component sheets of metal, sandwiching of a layer or coating of a certain weld preventing or separation material between the component sheets of metal in a pattern extending over only part of the area between superposed components and then a pressure welding step preferably at elevated temperature taking due precaution to prevent slippage between components and to protect the treated surfaces from contamination, excessive oxidation or atmospheric attack.

The assembly of component sheets prior to reduction must be substantially free from wrinkles or waves and should be of substantially uniform thickness from edge to edge which is preferably assured by suitable flatness and uniformity of thickness both longitudinally and transversely in the component sheets selected. Serious lack of uniformity in thickness will result in distortion of the resulting layer of separation in the finished product sometimes together with curvature in the longitudinal dimensions as well as loss of "squareness" in the stock and the included separation area. Lack of flatness interferes with preliminary treatment of the to-be-juxtaposed surfaces and with application of the pattern. While for most practical purposes such uniformity is desirable, an assembly of tapered or otherwise non-uniform thickness may be used provided the rolls are adjusted correspondingly to produce special articles.

A "stop-off" composition, i.e. a weld preventing or separation composition, is then applied in a thin layer in a special pattern to parts of one or more of the faces which are to be juxtaposed for joining. The composition, such as that disclosed in copending application Serial No. 296,262 filed June 28, 1952, is applicable in any particular pattern regardless of complexity. The applied pattern is foreshortened in the rolling direction so that upon completion of the process of this invention there is produced within the body of the metal a pattern of predetermined configuration and dimensions. Foreshortening is usually unidirectional as is the rolling.

The component aluminous sheets or layers, each substantially wrinkle-free and of substantially uniform thickness, are preliminarily assembled and brought together just prior to rolling to form a sandwich having the thin weld preventing material between adjacent plys in the pattern deemed suitable for the purpose as illustrated in the drawing. Preliminary assembly includes fastening the strips together in any manner as by an occasional rivet or widely spaced spot welds or by a staking operation sufficient to prevent any relative motion between component strips which would result in misalignment of the embrionic passageways of the pattern of "stop-weld" or bring about obliteration of the pattern between component sheets. In preparation for pressure welding by rolling the assembly of component aluminous sheets or layers together with the applied pattern of "stop-off" material is heated to a temperature in the hot working range. The rolling temperature will ordinarily be in the range from about 700° F. to about 1050° F., depending upon a number of factors including the nature of the aluminous metal used. Heating is carried on in a gas, oil, or electric furnace with due precaution to provide a protective atmosphere. After preassembly the hot "sandwiched" unit should be given a hot rolling reduction greater than about 60 percent in one pass to consistently obtain the desired aluminum sheet metal structure. Erection of finished hollow articles from this special sheet stock is accomplished by inflation with fluid pressure injected into the separation material area of the unitary body of the stock.

By aluminum or aluminous metal is meant pure aluminum including metal designated commonly as 2S and also aluminum alloys such as those presently commercially available known as 3S, 4S, 17S, 24S, 61S, 72S, and the like.

By means of an adequate rolling reduction of an assembly of superposed component metal layers of aluminum preferably of softest temper scratch brushed and heated to an elevated temperature above about 700° F. and usually in the range of temperature from about 700° F. to about 1050° F., there is obtained a substantially complete erasure of the interface between component layers. At temperatures substantially below this range consistent and proper bonding is not attained. At temperatures appreciably in excess of this range it becomes more difficult to obtain elongation of the metal without objectionable distortion of the pattern. As the temperature will vary somewhat with differences in the condition of the surface of the component sheets, with the furnace conditions encountered, with the character of the metal composition, and with the degree of metal reduction, in practical operation the temperature required may be accordingly adjusted by the operator to effect the desired result. Rolling of 2S aluminum is preferably accomplished in the temperature range from about 750° F. to about 900° F. It is important that the temperature of the "sandwich" at rolling be uniform throughout transverse to the elongation.

Rolling to accomplish pressure welding of the aluminum components so as to bring about substantially complete erasure of the line of demarcation consistently between the components or layers at places free from separation material is accomplished at a reduction of greater than about 60 percent in a single pass. Reduction greatly in excess of 60 percent will also produce good bonding. A reduction in the neighborhood of about 65 percent is preferred, however. The degree of distortion of pattern occurring on hot rolling and the frequency of undesired occurrence of bonding in the "stop-weld" areas particularly with aluminum increases at substantially higher reductions. It is essential that all the reduction to effect welding occur in a single pass while relative slippage between the component sheets is prevented because, if the first delivery of the composite assembly is at an inadequate reduction, further passes at a total reduction far in excess of that set forth herein will be of no avail. At about 65 percent reduction in one pass, with the surface of the component sheets suitably cleaned as by scratch brushing, not only are the components united as one strip but it was found that this reduction gives no excessive distortion in the pattern area. Such distortion as is involved is so limited and small as to be controllable or harmless. By distortion is meant the loss of linearity in the finished tube pattern in the direction transverse to elongation of the metal. Excessive distortion usually makes the finished article commercially unacceptable.

Whether or not the desired bond is obtained depends to an appreciable extent upon cleanliness of the surfaces to be bonded. Since the nature of aluminum militates against obtainment of a union readily, it is necessary that at least the surfaces to be joined each be carefully treated to remove foreign matter. The requisite cleanliness is obtained by any suitable operation such as degreasing followed by treatment to disrupt and substantially remove original oxides. The original layer of oxide may be chemically or mechanically removed, but it is preferred that the component aluminum strips be given a mechanical treatment involving scratch brushing those surfaces of the components which are to be merged in part. Surface cleanliness once obtained must be maintained until hot roll bonding is done. To insure preservation of cleanliness the surfaces are held together substantially in face to face contact and are immersed in a protective atmosphere especially during heating just prior to hot rolling.

A suitable "stop-off" or separation composition, for example, is one composed of colloidal graphite and preferably with calcium carbonate in the form of ground oyster shell for instance initially in a suitable vehicle such as water, which is subject matter of copending application Serial No. 296,262 filed June 28, 1952.

The preliminary scratch brushing treatment combined with the stop weld composition and rolling treatment enables the production of a surface structure of considerable advantage for heat exchangers. However, any heat resistant or refractory material or mixture, especially one with a carbonaceous or graphite base, may be employed so long as it serves to prevent welding between sheets in the area coated and is at the same time capable of being properly applied and elongated to a very thin interfacial layer with the metal during reduction by rolling without producing discontinuity in the pattern and without flowing uncontrollably under pressure. The former objectionable behavior would result in undesired bonding in the pattern area and the latter would result in lateral spread or obliteration of the pattern area. Such material is then applied to the cleaned surfaces of the component sheets by any suitable process such as one using a stencil formed of silk screen through which the material is squeezed by a suitable instrumentality. After application the pattern is then dried and is found to adhere to the sheet to which it has been applied and to have a thickness preferably of not less than about 0.0005 of an inch and not more than about 0.0025 of an inch for the rolling reduction preferred. Where very thick component bars of metal are employed, heavy reductions are contemplated and distortion is not objectionable, the separation material thickness may be as high as about 1/32 of an inch.

Although pressure welding may bring the pattern laminated stock to finish gage and length, it is preferable to do so by cold rolling so as to obtain maximum rolling reduction and thin gage metal with the least distortion of pattern together with the best control of final dimensions. When a final cold rolling is employed, it is necessary to anneal the stock prior to inflation in most instances.

To obtain development of a hollow sheet metal article such as a heat exchanger of the plate type, fluid pressure is injected into the relatively thin pattern of separation material enveloped within the sheet metal stock. Expansion occurs preferably between suitably spaced parallel platens such as those of a press the surfaces of which are either flat or otherwise suitably shaped. The separation between the platens determines the overall expansion of the conduit pattern and may be adjusted accordingly. For some purposes unconfined expansion is suitable. The injection of expansion media through the pattern occurs at that portion of the separation material which is intersected by an edge and at which the material is exposed. Exposure may be achieved by cutting the stock through an extending part of the pattern or by originally extending the pattern to one of the edges of the component sheets. To open the exposed separation material and accomplish injection at such part any pointed nozzle instrumentality may be used.

In the preferred embodiment illustrated in the drawing; a pair of component strips 1 and 2 of soft aluminum known to the trade as 2S–O aluminum, each having a thickness of about 0.125 of an inch and consisting substantially entirely of aluminum, are supplied by being unwound from coils 3 and 4 respectively as shown in Figure 1A. To provide the necessary surface flatness and cleanliness each strip 1 and 2 is treated as by having been first passed to a degreasing tank or other suitable means of cleaning of conventional type after which the strips are run through suitable straightening apparatus and then are mechanically treated by being each subjected to a scratch brushing. Surface 5 of strip 1 is treated by wire brush rolls 7 which gives a two pass treatment while rolls 8 in like manner clean surface 6 of strip 2. Instead of scratch brushing the strips 1 and 2 can be dipped in any suitable chemical cleaner to remove original surface oxides especially where the subsequent pressure welding reduction will be very severe. Rolls 7 and 8 are made up of wires having a diameter of about 0.007 of an inch, which is to say preferably from about 0.005 to about 0.010 of an inch. Brushing is carried on only until the original oxidized surface is disrupted and substantially completely removed and until not more than a maximum groove penetration of about 0.040 of an inch is attained to give scratched surfaces such as surface 9 on strip 2. If the brushing is carried on until the surface roughness is excessive, the applied stop-weld pattern will flow or "bleed" into the crevices and the periphery will not be sharp.

Immediately after scratch brushing, strip 2 is passed under a "stop-off" applicator 10 where separation material is applied to scratch brushed surface 9 as a coating in a desired adherent pattern 11, represented diagrammatically in Fig. 1A, or such as that shown in Figure 5 foreshortened by a factor such that upon completion of the pressure welding and cold reducing steps there is produced a finished conduit layout of predetermined configuration and size. After the foreshortened pattern 11 has been applied, it is dried in any suitable way as by being passed under infrared heater 12.

Component sheets 1 and 2 are now ready to be brought together with the treated faces 5 and 6 in contact except where the pattern 11 of separation material is between them by being passed over rolls 13 and 14 and then between pinch rolls 15 and 16. To prevent slippage between the components of the "sandwich," it is fastened together along the lateral edges adjacent the trailing end of the pattern by being, for example, passed between staking rolls 17 and 18 where staking at points 21 occurs as projections 19 and recesses 20 come into registry. If sheets 1 and 2 are permitted to move so as to slip or slide relative to each other and to the separation material pattern 11 prior to the hot rolling which follows, the pattern 11 is likely to be damaged by distortion or obliteration.

At this point, Figure 2, assembly 22 consists of component sheets 1 and 2 and a thin layer of weld preventing material 11 forming a thin layer adherent to one of the sheets and separating their juxtaposed surfaces 5 and 6 in the pattern area by a thickness of about 0.0015 of an inch. Both surfaces 5 and 6 have a scratch brushed structure 9 which in profile consists of troughs and sharp crests as shown having less than about 0.040 of an inch between the top of the crests and the bottom of the troughs.

Thus fastened the preliminary assembly 22 is passed as shown in Figure 1B to any suitable heating apparatus such as furnace 23, which is preferably an electric induction apparatus, where the assembly is quickly heated and just before discharge brought to a temperature of about from 980° to 1000° F. so as to allow for cooling of the metal in transit after discharge. To prevent impairment of surface cleanliness at the juxtaposed interfacial surfaces 5 and 6, the furnace 23 preferably is provided with a protective atmosphere of some inert gas such as argon or helium or with a reducing atmosphere such as the presently commercially available gas known as DX gas supplied through inlet 24. Heating of the strip assembly 22 is continued long enough to bring it up to the desired temperature uniformly at least over the entire assembled transverse portion which has undergone elevation of temperature and is ready for discharge therefrom for delivery to rolling mill 25. As soon as the assembly which has an overall thickness of about a quarter of an inch has come to a uniform temperature in the aforementioned range it is delivered with a minimum of delay to the heated working rolls 26 and 27 of the 4-high hot mill 25 where the assembly is hot roll bonded in a single pass to a thickness of about .087 of an inch which corresponds to a reduction of about 65 percent. Work rolls 26 and 27 are preheated to prevent heat shock to them and for better operation and control generally during pressure welding. The strip 28 issuing from the mill 25 is no longer a composite of discrete components but is now a unitary sheet, i.e. a single body of wrought metal enveloping a thin stratum of separation material. Final reduction to bring about by elongation the embryonic conduit pattern of predetermined configuration and size with remarkable accuracy is performed in a cold mill 29. Next the cold worked unitary strip 30 enters an annealing furnace 31 from which the new aluminum stock 32 issues ready for the next stage of fabrication to hollow ware.

Roll bonded stock 32, a portion of which is shown in cross section in Figure 3, to all appearances is indistinguishable from any other ordinary sheet of metal and is of a flat finished uniform thickness of about .080 of an inch, i.e. thinner than any one of the component sheets 1 or 2. In section 34 between the separation areas 33 the metal of stock 32 is substantially free from a parting line and has the strength of the parent metal. On microscopic examination stock 32 is found to be of substantially homogeneous structure typical of the metal of the original components. In the area 33 there are two juxtaposed internal surfaces 35 and 36 practically contiguous since they are separated by only a very thin expanse of the separation material which has not only prevented any undesired welding in area 33 but also has not become undesirably fugitive under heat and rolling pressure nor has it caused any unequal elongation which would be evident as waviness or lack of flatness in the stock and distortion in the separation areas 33.

In order to develop the conduit pattern from the enveloped stratum of separation material in stock 32, an extended portion 46, Figure 5, of the pattern 11 which forms a parting line at the edge 37, is after elongation of the pattern pried open in any suitable manner and an injection nozzle 38, Figure 4, is inserted into the opening and secured therein in any suitable way. The laminated stock 32, which may contain one or more interconnected whole patterns of separation material is next placed within the space between the flat polished surfaces of heavy platens 39 and 40 of a suitable inflation press. The platens are adjustably but fixedly spaced apart by a distance corresponding to the desired overall height of the conduits and are bolstered at this spacing. The injection nozzle is then connected by suitable means such as high pressure tubing to an hydraulic pump; and about 1000 to 7500 pounds per square inch fluid pressure is put against the interior faces 35 and 36 of the laminated stock 32 to expand the metal in the unwelded parts defined by the separation material 11 to produce cavity walls 41 and 42. The amount of fluid pressure necessary will vary with the gage, temper and conduit wall height. At greater expansion the cavity walls are strengthened by the resultant work hardening effect.

A typical pattern 11 suitable for application on strip 2 by applicator 10 is that shown in Figure 5 as having bands 44 extending generally transversely to the direction of rolling and bands 45 extending longitudinally with respect to the direction of rolling each correspondingly foreshortened so that upon completion of the reduction contemplated there is produced upon inflation in the finished hollow article a predetermined conduit system. In order that the stock 32 having such pattern elongated be adaptable to inflation, one part 46 of the pattern stratum 11 has been extended to an edge where an inflation device can be inserted. Following inflation of stock 32 there is produced the finished hollow article of Figure 6 in which tubes 47 have been developed from bands 44 of Figure 5 and in which tubes 48 have been developed from bands 45.

It is to be noted with reference to Figures 4 and 6 that the hollow article formed in accordance with this invention is characterized by desirably thick metal 43 between tubes which makes for better rigidity, strength and support while at the tubes the walls are relatively thin which in some practical applications makes for improved heat transmission. Furthermore, the interior of the tubes is found to have a surface structure such as to itself be responsible for considerably improving the heat transmission in the tube areas which is obviously of advantage where the article is a heat exchanger.

It is to be noted that on account of the presence of the "stop-weld" the aforementioned crest and trough structure 9 has not been obliterated by rolling in the tube areas and that as a result the internal surface of the tubes is striated.

In the embodiment illustrated in Figure 7, the body of the single aluminum sheet 49 embraces a large cavity 50 the walls of which 51 and 52 have been spaced apart by inflation. The cavity 50 is spaced from the periphery of the sheet 49 which also embraces a narrow passageway 53 interconnected with the cavity 50 from which passageway 53 extends to the periphery of sheet 49. The interior surface 54 of the cavity consists of striations which are responsible for greatly improving the heat transmission characteristics of the article illustrated. While one passageway 53 is shown, two or more may be interconnected with cavity 50.

As is apparent from the foregoing many advantages accrue from the present invention. The fabrication of superior articles of sheet aluminum with internal ducts or passageways of practically any desired design is permitted at lower cost. Relatively thick low cost strip may be employed since the desired duct or cavity wall thinness results from the pressure welding step. There is provided an economical method of making an integral thin gage strip adaptable to the manufacture of hollow plate type articles. Further, by means of the invention thin walled more efficient heat exchange devices of the plate type may be manufactured without resort to extensive heating and welding operations. The striated inner surface imparts superior heat transmissibility. Roll bonded sheet metal articles made as described herein are preferred over heretofore available soldered or welded sheet metal structures because of the superior strength obtainable which makes them capable of withstanding high inflation and operating pressures or other conditions which may bring about complete separation of the components of sheet metal articles commonly made by soldering or brazing. Likewise this invention permits the manufacture of strong light weight cavitied articles.

The term aluminum as employed in the appended claims is meant to include either the metal itself, with or without the usual impurities, or the metal in the form of its alloys having like advantageous properties.

Since many other embodiments of my invention may occur to those skilled in the art, it is to be understood that the foregoing is intended by way of illustration of a preferred embodiment and not as a limitation of the scope of the present invention except as set forth in the appended claims.

What is claimed is:

1. The process of making aluminum strip adaptable for fabrication of hollow articles by fluid pressure inflation comprising sandwiching a unidirectionally foreshortened pattern of separation material between pressure weldable surfaces of superposed flat component sheets of aluminum, subjecting the assembly of component sheets while constrained against slippage with respect to each other about the pattern to a reduction in thickness of about 65% in a single pass over the area of the assembly in the temperature range from about 750° F. to about 900° F. so as to pressure weld the component sheets in substantially all of the area not separated by said material.

2. The process of making aluminum strip adaptable for fabrication of hollow plate type ware by fluid pressure inflation comprising sandwiching a unidirectionally foreshortened pattern of separation material between pressure weldable surfaces of two superposed component sheets of aluminum, subjecting the assembly of component sheets while constrained against slippage with respect to each other about the pattern to a reduction in thickness of greater than about 60 percent in a single pass over the area of the assembly so as to pressure weld the component sheets in substantially all of the areas not separated by said material at a temperature in the range from about 700° F. to about 1050° F.

3. The process of making aluminum strip adaptable for fabrication of hollow plate type ware by fluid pressure inflation comprising the steps of providing a pair of component sheets of aluminum, scratch brushing the to-be-juxtaposed surfaces of the component sheets to render the surfaces pressure weldable, applying a unidirectionally foreshortened pattern of separation material upon the brushed surface of one of said sheets, fastening said component sheets with the brushed surfaces fixed in juxtaposition so as to prevent interfacial slippage, raising the temperature of the assembly of component sheets between 700° F. and 1050° F. while preventing contamination of the juxtaposed surfaces and then giving said heated assembly a rolling reduction of greater than about 60 percent in a single pass while uniformly at elevated temperature to produce a unitary strip joined over substantially all of the juxtaposed surfaces not separated by said pattern and thereafter rolling said strip and the included pattern of separation material to an ultimate design of predetermined configuration and dimensions adaptable to formation of a passageway within the body of the strip upon application of fluid pressure along the pattern of separation material.

4. The process of making aluminum strip adaptable for fabrication of hollow plate type ware by fluid pressure inflation comprising the steps of providing a pair of component sheets of soft aluminum, scratch brushing the to-be-juxtaposed surfaces of the component sheets to a penetration sufficient to remove surface contaminants and provide a surface configuration of alternate striations and grooves to a depth not in excess of about 0.040 of an inch below the adjacent striations, applying a unidirectionally foreshortened pattern of graphitic separation material which has a thickness of not less than about 0.0005 of an inch and not more than about 0.0025 of an inch upon the treated surface of one of said sheets by means of a silk screen stencil, fastening said component sheets with the cleansed surfaces fixed in juxtaposition so as to prevent interfacial slippage, raising the temperature of the asssembly of component sheets to from about 700° F. to about 1050° F. while preventing contamination of the juxtaposed surfaces and then giving said assembly a rolling reduction of greater than about 60 percent in a single pass while within said elevated temperature range to produce a unitary strip joined over substantially all of the juxtaposed surfaces not separated by said pattern and thereafter cold rolling said strip to the desired ultimate elongation so as to enable expansion of the included pattern of separation material to an ultimate design of predetermined configuration and dimensions adaptable to formation of a passageway within the body of the strip upon application of fluid pressure along the pattern of separation material.

5. The process of making aluminum strip adaptable for fabrication of hollow ware comprising treating aluminum component sheets by removing substantially all of the surface contaminants and original oxides on their surfaces to be welded together, applying a pattern of separation material to a treated surface of one of said sheets, forming a sandwich assembly by superposing upon said one sheet another of said sheets with its treated surface over said pattern so that said pattern is between the treated surfaces of said superposed sheets, constraining said superposed sheets against slippage with respect to each other, raising the temperature of the assembly of component sheets to a temperature in the range from about 700° F. to about 1050° F., subjecting the assembly of component sheets while so constrained to a reduction in thickness uniformly over the area of the assembly in a single pass to effect welding of adjacent treated surfaces in substantially all of the areas not separated by said material with the total reduction imparted to said assembly amounting to at least about 60%.

References Cited in the file of this patent

UNITED STATES PATENTS

| | | |
|---|---|---|
| 2,662,273 | Long | Dec. 15, 1953 |
| 2,690,002 | Grenell | Sept. 28, 1954 |
| 2,691,815 | Boessenkool et al. | Oct. 19, 1954 |
| 2,718,690 | Ulam | Sept. 27, 1955 |
| 2,740,188 | Simmons | Apr. 3, 1956 |
| 2,759,247 | Grenell et al. | Apr. 21, 1956 |
| 2,766,514 | Adams | Oct. 16, 1956 |

FOREIGN PATENTS

| | | |
|---|---|---|
| 6,735 | Great Britain | Apr. 10, 1901 |